United States Patent [19]

McAdams

[11] 3,793,126
[45] Feb. 19, 1974

[54] A BOUQUET FORM FOR USE IN THE PREPARATION OF FLORAL ARRANGEMENTS

[76] Inventor: Newton Day McAdams, 326 Birkdale Ave., Lake Bluff, Ill. 60044

[22] Filed: Mar. 22, 1971

[21] Appl. No.: 126,544

[52] U.S. Cl............ 161/28, 47/55, 161/31, 248/27.8
[51] Int. Cl........ A01n 3/00, A01g 5/00, A47g 7/00
[58] Field of Search.......... 161/27–28, 31; 47/55; 248/27.8

[56] References Cited
UNITED STATES PATENTS

| | | | |
|---|---|---|---|
| 3,002,308 | 10/1961 | Decamp | 161/27 |
| 2,390,858 | 12/1945 | Walker | 47/55 |
| 3,318,044 | 5/1967 | Kise | 161/27 X |
| 3,452,476 | 7/1969 | Kise | 248/27.8 X |
| 2,514,177 | 7/1950 | Brown, Jr. | 47/55 X |

Primary Examiner—Philip Dier
Attorney, Agent, or Firm—Roy H. Olson et al.

[57] ABSTRACT

A bouquet construction and method of fabrication utilizing a novel floral form. The form employed includes one or more elongate stem portions and a plurality of petiole or auxiliary stem portions depending therefrom, each said petiole terminating in one or more leaflet shaped pads adapted to have a floral element applied thereto. The petiole stem portions are disposed and of a selected number such that they may be positioned to arrange the leaflet shaped pads in a geometric pattern conforming to the floral pattern desired. The floral form is constructed so as to resemble a plant stem and preferably of material permitting bending thereof.

9 Claims, 9 Drawing Figures

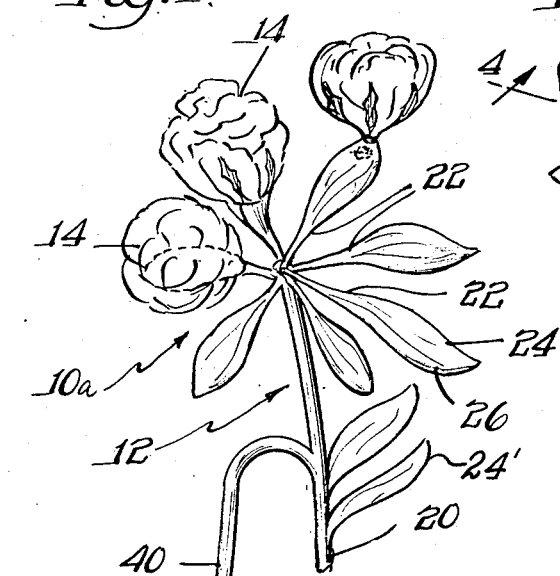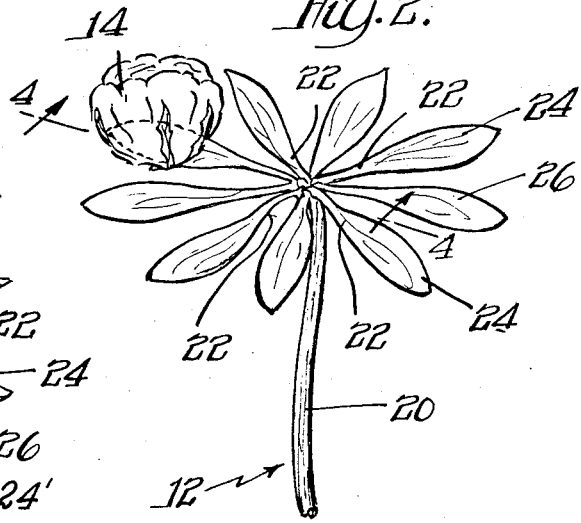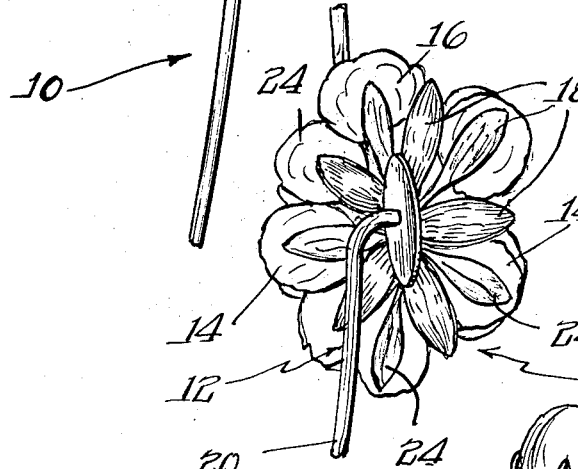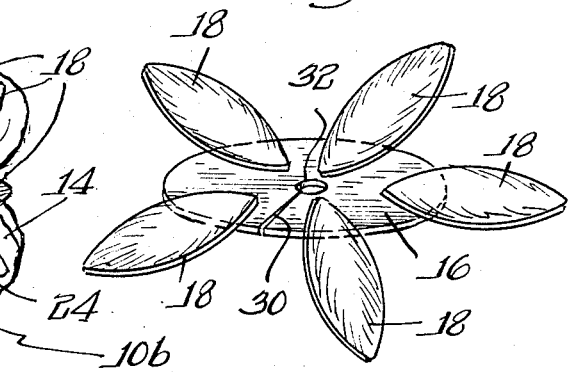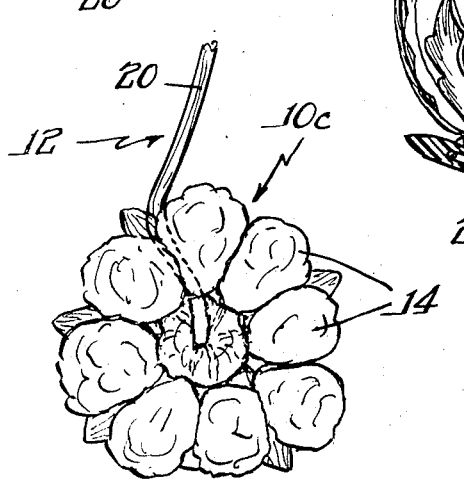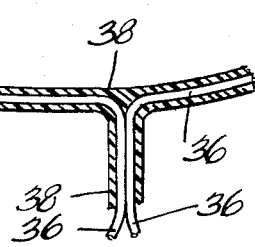

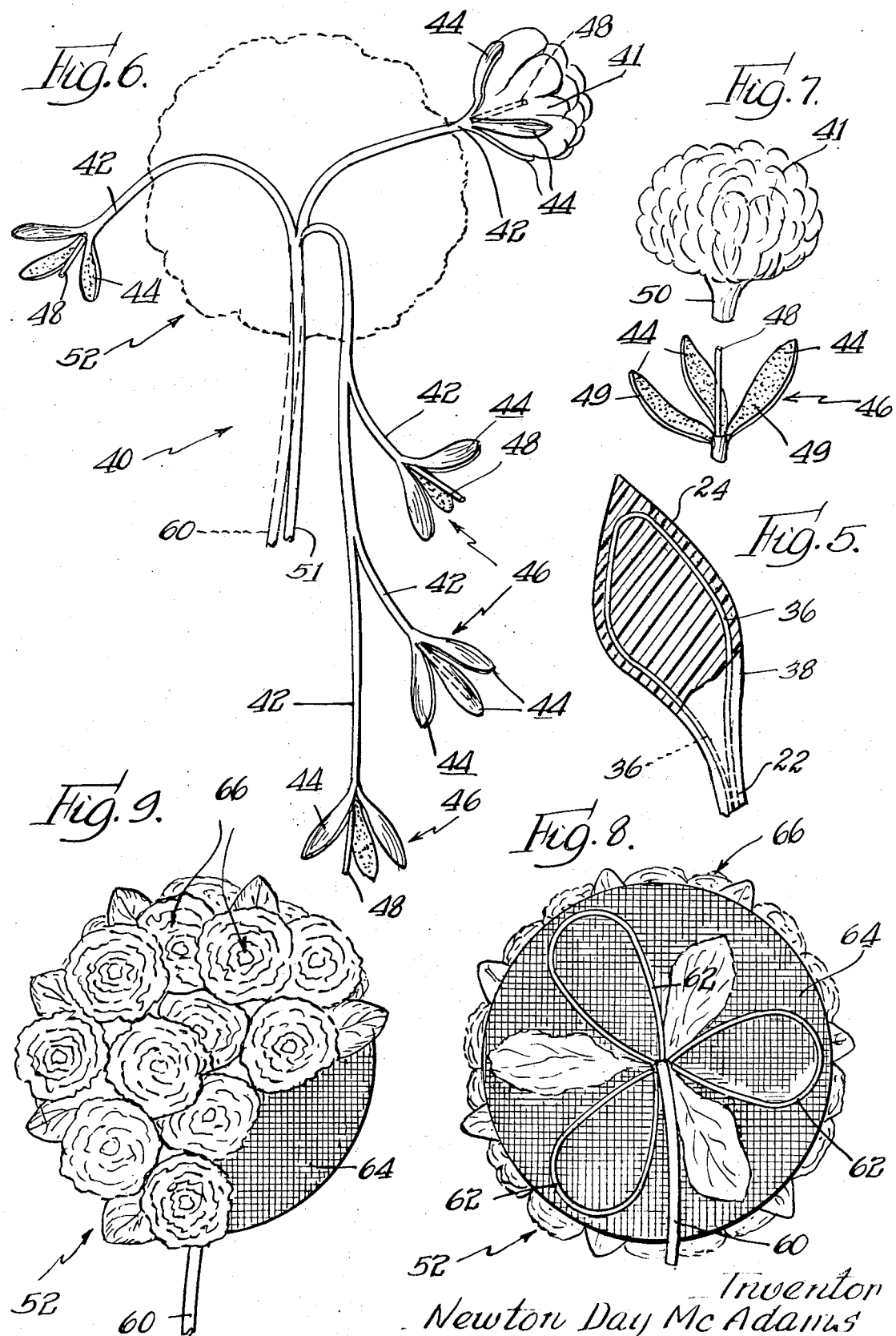

A BOUQUET FORM FOR USE IN THE PREPARATION OF FLORAL ARRANGEMENTS

BACKGROUND OF INVENTION

The present invention is concerned with floral bouquets, corsages, or the like. More specifically, this invention provides a bouquet construction and method of assembly wherein a form is employed which is fabricated and designed to provide mounting surfaces to which floral elements may be quickly and easily attached by the use of adhesive compounds.

The accepted practices of bouquet and corsage construction now in use require highly skilled floral designers, and also that considerable time be expended in both initial preparation and final assembly. In addition, these practices are somewhat limited in that they do not readily possess the versatility of design and use of materials that may be achieved with the present invention as will be detailed hereinafter. Also, while a floral designer may work rapidly and efficiently on several bouquets, the quality and speed of his work will fall off as the day wears on. As such, the considerable time expended and the highly skilled personnel required to construct floral arrangements using these prior art practices result in increased overhead to the florist and ultimately, the high cost of the finished product. In fact, the scarcity of skilled, highly efficient floral designers has prompted many florists to refuse to handle floral bouquets and corsage orders or alternately, to contract out orders such as these.

More specifically, while these prior art practices vary, depending upon the type of flower or flowers used and the style of the bouquet, the general steps of preparation and assembly are similar. First of all, the individual flowers must be prepared for mounting which involve wiring and taping operations. In this instance, the time required will vary inversely with the size of the flower, viz., smaller, delicate flowers requiring more attention than larger ones. Initially, the flower is connected to a simulated stem constructed of green enameled wire which must be sufficiently rigid to support the flower at a considerable distance. If desired, a piece of wet cotton is inserted into the throat or the cut stem of the flower at this time so as to provide a source of moisture both during the extended preparation period and thereafter. This use of wetted cotton also aids in maintaining the flower in assembly on the wire stem which may be inserted in the cut stem of the flower. In practice, the time consumed in wiring flowers for an average size bouquet is approximately 30 minutes.

Once the flowers have been properly wired, they must then be taped. In this operation, the cut section of the flower stem and the adjacent portion of the wire are covered with floral tape. The taping of flowers for an average bouquet will consume an additional 10 to 15 minutes.

The handling to which the flowers are subjected during the wiring and taping operations is detrimental and materially shortens their life. Accordingly, the flowers must now be dipped in water and refrigerated in order to rejuvenate them prior to the final arrangement. To insure maximum life, the flowers must be refrigerated for at least 45 minutes.

In addition, it should be noted that the basic steps outlined above in wiring and taping flowers, must also be employed in the preparation of any foliage that is to be used in the bouquet.

With the wiring and taping operations completed, the head floral designer now takes over. This individual is highly skilled and has had many years of experience in floral design, and as such, his time is at a premium. A head designer will work with the taped and wired flowers and foliage, assembling, arranging and spacing them so as to attain the desired floral pattern. Once properly arranged, the wired stems are firmly bound together by taping, and additional wire, tape and ribbon are employed to form a handle, if a bouquet is being constructed.

As can be seen from the above discussion, the time elapsed from commencement of the initial preparatory steps to the attainment of the final creation is considerable. Therefore, any aid or alternate procedure which can shorten this period is of considerable significance to florists.

These disadvantages and high cost of the aforediscussed practices have not gone unnoticed, and there have been many attempts at providing preassembly practices that could be employed in advance of a busy weekend, which would permit flowers to be attached at the last minute. These efforts have met with little success. For the most part, these approaches do not adequately solve the problem of attachment of the flowers, and generally do not provide for the use of foilage as an accent to the flowers without resorting to the standard wiring and taping methods.

The present invention envisions the employment of a bouquet construction and method of assembly which utilizes a novel, prestyled form, the use of which overcomes the inherent disadvantages of the prior art practices and provides certain advantages previously unattainable. This form is constructed such that the wiring and taping operations are virtually eliminated, as is the necessity for employment of a highly skilled floral designer in the final preparation and arrangement of the bouquet. In addition, the prestyled form to be detailed hereinafter, assures perfect physical balance in the final product, permits the use of various accent items such as foilage, jewelry, or the like, and does so without sacrificing the wide variety of styles and arrangements demanded by the public. As such, it is possible with the present invention for inexperienced, less skilled employees to turn out floral creations which heretofore could only be achieved by floral designers, the total investment in time and expense being considerably less than with the prior art practices described above.

DESCRIPTION OF THE ILLUSTRATED EMBODIMENT

FIG. 1 is a segmented view of one type of bouquet constructed in accordance with the teachings of the present invention; the upper portion thereof illustrating, in exploded fashion, the details of the prestyled form and the manner of attaching flowers thereto;

FIG. 2 is a partial perspective view of the upper portion of the bouquet of FIG. 1;

FIG. 3 is a perspective view of an accent accessory useable in conjunction with the present invention;

FIG. 4 is a fragmentary, partial sectional view taken along the lines 4—4 of FIG. 2 in the direction indicated;

FIG. 5 is a sectional view of one form of leaflet pad for a bouquet form constructed in accordance with the present invention;

FIG. 6 is a perspective view of another embodiment of the present invention, the form itself being illustrated in full line and the accent item of FIGS. 8 and 9 being shown in dotted outline to illustrate its use in this embodiment;

FIG. 7 is an exploded perspective view of the leaflet construction employed with this embodiment illustrating the manner of attaching a flower thereto;

FIG. 8 is a rear view of an accent item designed for use with the form of FIGS. 6 and 7; and FIG. 9 is a rear view of the accent item of FIG. 8 with petal florets and foliage disposed thereon.

DESCRIPTION OF THE ILLUSTRATED EMBODIMENT

Turning now to the drawings, the basic concept of the present invention will be described in conjunction with the embodiment of the bouquet form and construction illustrated in FIGS. 1–4 and designated generally 10, that of FIGS. 6–9 representing an alternate construction. It must be kept in mind however, that the arrangement or physical orientation of the bouquets illustrated represent but two styles that can be employed. That is, prestyled bouquet forms, in accordance with either embodiment of this invention, may be designed for use in the construction of bouquets of numerous and varied styles.

The bouquet of FIG. 1 is illustrated in three portions with the middle portion 10b thereof rotated approximately 90° relative to the upper and lower portions 10a and 10c, respectively. This has been done for illustrative purposes so as to expose to view the rearward side of the bouquet construction.

The bouquet 10 is comprised primarily of the form 12, a plurality of flowers 14 and various and numerous accent accessories, such as the foliage bearing disc shaped panel 16 of FIG. 3. As is described and detailed hereinafter, the flowers 14 are applied by use of an adhesive compound, which may also be used to mount the foliage 18 to the disc 16. As such, the flowers 14 and foilage 18 need not be wired and taped preparatory to assembly. This permits last minute assembly and curtails handling of the floral elements during preparation of the bouquet, both of these factors significantly prolonging the life of said floral elements.

The bouquet form 12 of FIGS. 1–4 is comprised of a continuous stem which, for descriptive purposes, shall be considered as formed from a series of elongate stem portions 20. This approach is believed advantageous, as the forms 12 for other styles or types of bouquets will vary from that illustrated, in that they will employ a plurality of interconnected elongate stem portions as is needed to attain the floral design desired. Each elongate stem portion 20 has a number of auxiliary stem portions 22 depending therefrom. These stems or stem portions 22 simulate the petiole of a leaf, and terminate in leaflet shaped pads 24 which provide a relatively broad mounting surface area 26 for engagement with the flowers 14.

With the embodiment illustrated in the present drawings, the petiole or auxiliary stem portions 22, for each main stem portion 20, are arranged in a rosette pattern. However, it must be understood that alternate arrays may be employed, such as random or compound leaf patterns, or combinations of these patterns. With the random or compound leaf patterns, the auxiliary stem portions 22 will be disposed along the length of the elongate stem portion, rather than grouped in a rosette, as illustrated, such as depicted in FIG. 6. In addition, as is shown with regard to the intermediate bouquet section 10b, the main stem portion 20 may be branched at one or more locations with the auxiliary stem portions 22 depending therefrom.

The manner of attaching the flowers 14 to the leaflet shaped pads 24 of this embodiment is best viewed in FIG. 4. In this regard, an adhesive is applied to the surface area 26 of the leaflet and is allowed to become tacky, at which time a flower 14 is pressed into place. Several floral adhesives are available for this purpose, one type being sold by the Floral Chemetics Company of Bakersfield, Calif.

Directing attention to FIG. 3, the bouquet form 12 of the present invention possesses considerable versatility and desirability from a florist's viewpoint in that it lends itself to use with numerous accessory or accent items. One form of accent item is the foliage bearing panel 16 illustrated in FIG. 3. The panel 16 has a radial slit 30 which extends from an edge thereof and communicates with a central aperture 32 sized to closely receive the elongate stem portion 20. Accordingly, the panel can be spread slightly at the slit 30 and a stem portion 20 passed therethrough and disposed in the aperture 32. The panel 16 can then be moved into position proximate the auxiliary stems or petioles 22 which provide the rosette arrangement. The foliage 18, or for that matter, other accent items such as ribbons, jewelry, etc., may be attached to the panel 16 either before or after its mounting to the stem portion 20. Once the completed panel 16 is in position, it will add background to the rosette arrangement, with the accent items carried thereby enhancing the overall aesthetic effect.

With reference now to FIGS. 4 and 5, the general construction of the bouquet form 12 of the present invention will be considered. In this regard, the form 12 is comprised of a plurality of wire elements 36 which are bunched or grouped to provide an inner core or frame for the main stem portion 20. Individual elements 36 extend outwardly from the main stem portion 20 in order to provide the core for the auxiliary stem portions 22. A resinous, plastic-like material 38, colored to approximate the various hues of stems, is then applied over the wire frame elements 36 by molding or some other process, imparting to the form 12 the appearance of floral stems. In this regard, it should be noted that the wire frame elements 36, which define the petioles or auxiliary stem portions 22 may merely be attached to a central wire segment forming the main stem portion 20 at the point of juncture, or as mentioned previously, they may extend for a considerable distance along the length of said main stem portion 20.

In the embodiment of FIGS. 1–4, the ends of the wire elements forming the auxiliary stem portions 22 are looped, so as to provide frames for the leaflet shaped pads 24. This construction is best illustrated in FIG. 5. With reference to FIG. 1, it can best be seen that this concept may be employed to provide leaflets 24' at various locations along the length of the main stem portions 20 as is desired. In addition, a segment of wire may be attached to said main stem portion and a resinous, plastic-like material applied thereover to provide a handle 40, also illustrated in FIG. 1.

Directing attention now to FIGS. 6-9, an alternate form construction to that previously discussed with regard to FIGS. 1-4 is illustrated and designated generally 40. The form 40 differs from the form 12, not only in the general style of bouquet for which it is to be used, but also with regard to the construction of the ends of the respective auxiliary stem segments and correspondingly, the manner of mounting the flowers 41 thereto. More specifically, a series of auxiliary stem portions 42 are employed which are branched or interconnected to provide an overall stem configuration; however, since a random or leaf-type pattern is utilized, there is no main or primary stem portion corresponding to the item 20 of form 12.

As to the similarities between the respective embodiments, both employ a wire frame having a resinous, plastic-like material formed thereover so as to give the appearance of a floral stem. Also, the leaflets employed with the form 40 may be constructed in a manner similar to that as discussed in conjunction with FIG. 5.

Looking now to FIG. 6, each auxiliary stem portion 42 of the form 40 terminates in a series of leaflets 44 which are disposed so as to provide a cuplike arrangement, designated generally 46. Positioned in the center of each cuplike arrangement 46 is a wire end segment 48, which conveniently may be the end portion of one of the wire elements used in the core or frame for the stem portion 42.

FIG. 7 illustrates the manner in which a flower 41 is to be attached to the respective cuplike arrangements 46. Initially, adhesive 49 is applied to each of the leaflets 44, and then the cut stem 50 of a flower 41 is engaged over the wire segment 48. The flower 41 is properly positioned with respect to the cuplike arrangement 46 by disposing the wire 48 well into the stem 50. Next, the adhesive coated leaflets 44 are gently moved into engagement with the flower 41, and as the adhesive 49 solidifies, the flower will be firmly held within the cuplike arrangement 46.

It can be seen, that the wire end segment 48 will aid materially in properly holding the flower 41 in position. While the use of a wire end segment 48 is desirable for many types of bouquets, it is envisioned that same may be dispensed with if desired, and only adhesive relied upon as a mounting agent. In addition, it is also to be understood that the floral mounting arrangement of FIGS. 6 and 7 is an alternate embodiment to that of FIG. 1. That is, a cuplike arrangement 46, with or without the wire segment 48, may be used with form 12 in place of the individual leaflets 24. Or, alternately, individual leaflets can be employed with the form 40 and adhesive utilized to provide the necessary holding force required to maintain the flowers in position.

As can be seen from FIG 6, the form 40 also includes a handle designated generally 51, said form being of a particular type and style designed to be utilized in conjunction with an accent item 52, illustrated in detail in FIGS. 8 and 9. The accent item 52 provides a base to which petal florets and foliage may be attached, the accent item 52 then being employed in conjunction with the form 40 in a manner shown in phantom in FIG. 6 to complete the bouquet construction.

Directing attention now to FIGS. 8 and 9, a preferred construction of the accent item 52 will be considered. In this regard, as can be seen in FIG. 8, the accent item 52 is comprised of a handle segment 60 and a plurality of loops 62 depending therefrom. The loops 62 support a circular segment of wire screening 64 which is attached to said loops 62 in a desired manner such as by an adhesive or stapling.

FIG. 9 is a front view of the accent item 52. As can be seen, the circular screen segment 64 provides a base to which various petal florets and foliage 66 have been mounted. In addition, to enhance the overall aesthetic effect of the accent item 52, foliage may be attached to the rear side of the wire screen 64 to cover the loops 62.

It is envisioned that the handle 60 and loop segments 62 of this accent item 52 may be constructed in a manner similar to that employed with the frames 12 and 40. That is, a wire core or frame is utilized over which is formed a resinous, plastic-like material. However, it can be appreciated that the accent item 52, as well as said forms 12 and 40, may be fabricated by other methods, if desired.

Either before or after the various flowers, petal florets and foliage are attached to accent item 52 and form 40, these elements are positioned as illustrated in phantom in FIG. 6 with the respective handle segments 51 and 60 juxtaposed. These handle segments 51 and 60 are then taped or otherwise fastened together, such that an integral unit is provided.

In summary, a florist can thus be provided with numerous bouquet forms such as 12 or 40, each specifically designed for a particular style of bouquet. With the illustrated construction, the forms 12 and 40 are bendable so that the position or arrangement of the auxiliary stem portions 22 and 42 can be altered to provide the precise geometric pattern desired. In addition, this feature of bendability facilitates shipping and storage of the forms. When the florist has a call for a bouquet, he need merely select the most appropriate form, then arrange the elongate and auxiliary stem portions 20 and 22 or 42, such that the leaflet shaped pads 24 or 44 provide a predetermined geometric pattern. Next, with the use of an adhesive; flowers, foliage and other accent items are applied directly to said pads. The end result is a physically balanced bouquet that has been constructed with a minimum amount of time and effort, as well as with a minimum amount of handling of the floral elements.

It should be noted that the foregoing description has been presented in conjunction with the embodiments illustrated in the drawings, and that numerous alterations and modifications are envisioned. More specifically, the general configuration of the forms will be different for each style of bouquet, also the manner and mode of fabricating the forms may vary from that described. As such, those skilled in the art will envision certain changes, substitutions or modifications which fall within the spirit and scope of the present invention which are defined by the claims appended hereto.

What is claimed is:

1. A bouquet form for use in the preparation of floral arrangements, said florm including a plurality of auxiliary stem portions interconnected to provide an overall stem configuration, each said auxiliary stem portion terminating in a series of leaflet-shaped pads disposed to provide a cup-shaped arrangement adapted to have a floral element applied thereto, and said auxiliary stems being disposed and of a selected number, such that they may be positioned to arrange the leaflet pads in a geometric pattern conforming to the floral pattern desired; and a handle portion formed integral with said overall stem configuration; said form being bendable and comprised of a plurality of wire elements having a resinous plastic-like material applied thereover.

2. A bouquet form as defined in claim 1 wherein the wire elements defining the auxiliary stem portions have looped ends with said resinous, plastic-like material applied thereover, said looped ends defining the leaflet shaped pads.

3. A bouquet form as defined in claim 1 wherein a wire element is provided in conjunction with each said cupshaped arrangement, such that a cut stem of a floral element may be disposed over said wire element to facilitate mounting thereof.

4. A bouquet construction including a bendable form comprised of a plurality of auxiliary stem portions depending from a main stem configuration, and an integral handle portion, each said auxiliary stem portion terminating in at least one leaflet shaped pad providing a mounting surface, a plurality of floral elements attached by an adhesive to the mounting surface provided by said pads, said auxiliary stem portions being disposed and of a selected number, such that the leaflet shaped pads may be arranged in a geometric pattern with the floral elements attached thereto providing the desired floral pattern.

5. A bouquet construction as defined in claim 4 wherein said bendable frame is comprised of a plurality of wire elements having a resinous, plastic material applied thereover.

6. A bouquet construction as defined in claim 5 wherein the wire elements defining the auxiliary stem portions have looped ends which define the configuration of said leaflet shaped pads.

7. A bouquet construction as defined in claim 4 wherein each said auxiliary stem portion terminates in a series of leaflet shaped pads which are disposed to provide a cupshaped arrangement, such that a floral element may be disposed within said cuplike arrangement and affixed thereto by an adhesive.

8. A bouquet construction as defined in claim 7 wherein a wire element is provided in conjunction with each said cupshaped arrangement, with a cut stem of a floral element may be disposed over said wire element to facilitate mounting thereof.

9. A method of fabricating a floral bouquet including the steps of: providing a bendable form having a plurality of auxiliary stem portions interconnected to provide an overall stem configuration and each terminating in at least one leaflet shaped pad providing a mounting surface; arranging said auxiliary stem portions so that the leaflet shaped pads form a predetermined geometric pattern; and applying floral elements to said pads with an adhesive compound wherein said floral elements cooperate to provide the desired floral arrangement.

* * * * *